(12) United States Patent
Gilbert

(10) Patent No.: US 7,651,796 B2
(45) Date of Patent: Jan. 26, 2010

(54) WATER ATOMIZATION APPARATUS FOR A FUEL CELL SYSTEM AND ALSO A METHOD FOR HUMIDIFYING A GAS FLOW SUPPLIED TO A FUEL CELL SYSTEM

(75) Inventor: Maik Gilbert, Ginsheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 1565 days.

(21) Appl. No.: 10/378,421

(22) Filed: Mar. 3, 2003

(65) Prior Publication Data

US 2003/0170506 A1 Sep. 11, 2003

(30) Foreign Application Priority Data

Mar. 6, 2002 (DE) ................. 102 09 808

(51) Int. Cl.
*H01M 8/00* (2006.01)
*H01M 2/00* (2006.01)
(52) U.S. Cl. ............... 429/12; 429/13; 429/34
(58) Field of Classification Search ......... 429/12, 429/13, 34
See application file for complete search history.

(56) References Cited

U.S. PATENT DOCUMENTS 6,294,277 B1 9/2001 Ueno et al. .............. 429/22

| | | | |
|---|---|---|---|
| 6,696,186 B1 * | 2/2004 | Herdeg et al. | 429/13 |
| 6,696,192 B2 * | 2/2004 | Kanai et al. | 429/34 |
| 6,916,564 B2 * | 7/2005 | Clawson et al. | 429/17 |
| 6,932,282 B2 * | 8/2005 | Herd et al. | 239/548 |

FOREIGN PATENT DOCUMENTS

| DE | 196 41 143 | 4/1987 |
|---|---|---|
| DE | 100 36 916 | 2/2002 |
| EP | 1 052 717 | 7/2002 |

* cited by examiner

*Primary Examiner*—Patrick Ryan
*Assistant Examiner*—Karie O'Neill

(57) ABSTRACT

A water atomization apparatus for a fuel cell system, comprising a plurality of fuel cells connected together to form a fuel cell stack and each having an anode, a cathode and a membrane, with the fuel cell stack having an anode side with an inlet for a fuel and an outlet for non-consumed fuel and exhaust gases which arise at the anode side, a cathode side with an inlet for a gaseous oxidation agent such as air and an outlet for exhaust gases arising at the cathode side, and a compressor connected upstream of the cathode side inlet, is characterized in that the water atomizing apparatus comprises a supply tank for deionized water, a pressure pump which is connected to the supply tank, a reservoir which is fed by the pressure pump and contains deionized water under pressure in operation, a pressure regulating valve having an inlet connected to the reservoir and determining the operating pressure which prevails in the reservoir and also at least one controllable injection valve which injects atomized water into the cathode side and or into the anode side of the fuel cell stack.

45 Claims, 1 Drawing Sheet

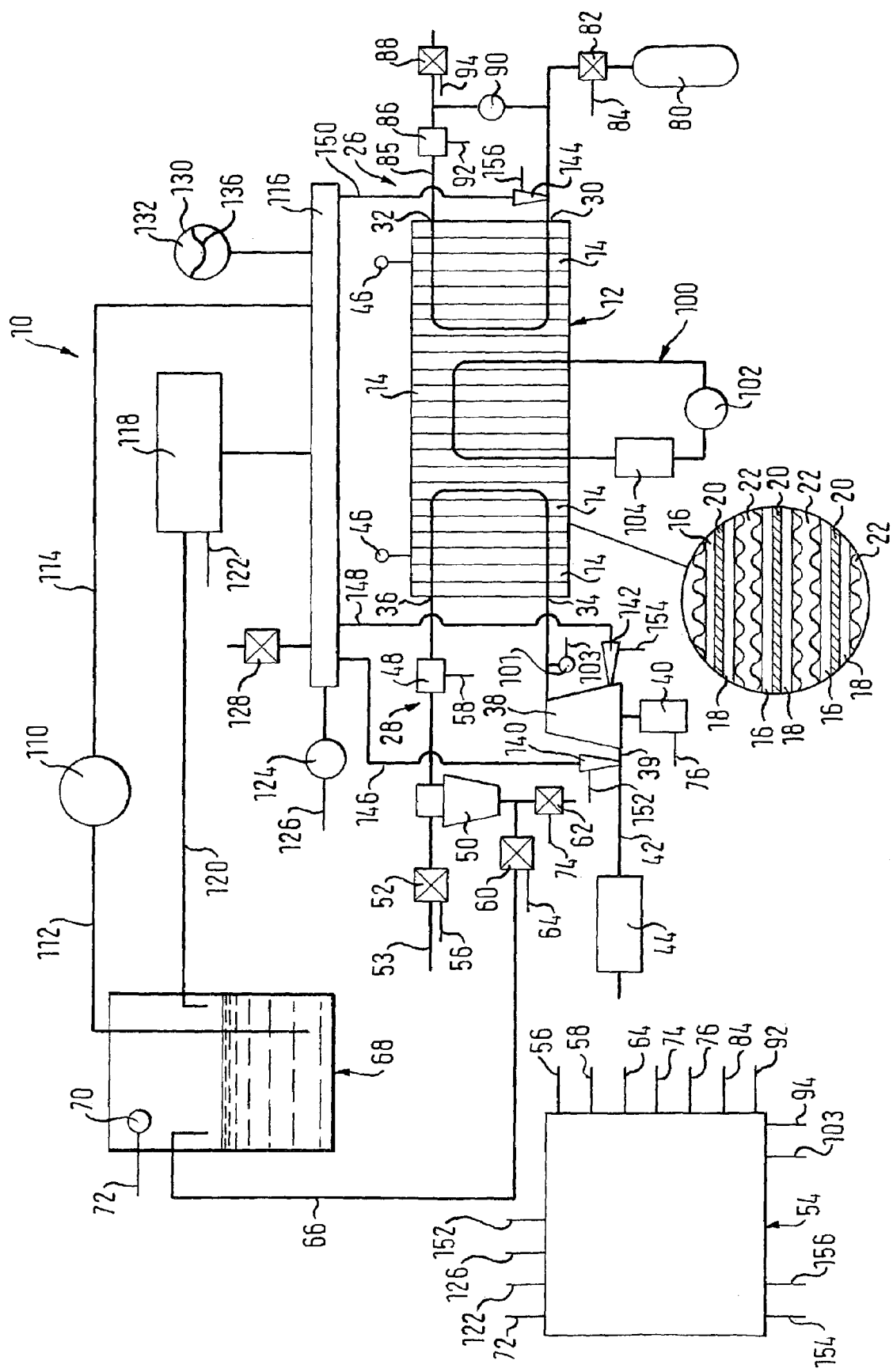

WATER ATOMIZATION APPARATUS FOR A FUEL CELL SYSTEM AND ALSO A METHOD FOR HUMIDIFYING A GAS FLOW SUPPLIED TO A FUEL CELL SYSTEM

TECHNICAL FIELD

The present invention relates to a water atomization apparatus for a fuel cell system and also to a method for the humidification of a gas flow supplied to a fuel cell system.

BACKGROUND OF THE INVENTION

As is generally known, a fuel cell system frequently comprises a plurality of fuel cells assembled together to form a fuel cell stack which each have an anode, a cathode and a membrane. The anodes of the individual fuel cells are electrically connected together so that one speaks of the anode side of the fuel cell stack. In the same manner the cathodes of the individual fuel cells are electrically connected together and one speaks here of the cathode side of the fuel cell stack. At the anode side the fuel cell stack has an inlet for a fuel and an outlet for a non-consumed fuel and also for exhaust gases which arise at the anode side. At the cathode side the fuel cell stack likewise has an inlet, either for a gaseous oxidizing agent such as air and an outlet for exhaust gases which arise at the cathode side, with a compressor normally being connected upstream of the cathode side inlet of the fuel cell stack.

It is generally known that the membranes of the individual fuel cells must be kept moist in operation in order, on the one hand, to protect them from damage and, on the other hand, to achieve a high degree of efficiency.

In the operation of a PEM fuel cell (PEM=proton exchange membrane) protons which originate from the hydrogen component of the fuel supplied to the anode side migrate through the humidified membranes and react at the cathode side with the oxidizing agent, which is normally supplied in the form of atmospheric oxygen, and thereby form water with the simultaneous generation of electrical power. Thus water always arises at the cathode side. In the operation of the fuel cell stack a part of this water diffuses through the membranes to the anode side of the fuel cell stack so that both sides of the fuel cell stack are humidified. Since the water which is produced is frequently present in excess it is removed from the anode side and the cathode side and then collected and/or drained off.

Despite this water which is produced in operation, the problem nevertheless remains that the gaseous oxidizing agent supplied to the cathode side and also the fuel supplied to the anode side have to be adequately humidified so that in all operating states of the fuel cell system, for example during startup and with dry environmental conditions, i.e. dry air, the membranes are always kept moist and an adequate humidity is present both at the anode side and also at the cathode side.

The active humidification of the gas flows that are supplied is frequently restricted to the cathode side of the fuel cell system, because this is generally sufficient in order to humidify the membranes and, as already stated above, a diffusion through the membranes to the anode side of a fuel cell system in any event takes place. Up to now relatively complicated devices are known for the humidification of the gas flows which are operated with fully demineralized, i.e. deionized water which originates from the operation of the fuel cell system. Since such humidifying apparatuses are not only complicated but also take up a relatively large amount of space another system has been tested at the applicants premises in which two nozzles are supplied with deionized water from a pressure pump and the nozzles spray water into the induced air stream. It has, however, been shown that droplet formation can occur, in particular on switching on the pressure pump, which can lead to problems. When switching on the pressure pump a sudden pressure loading of the nozzles arises which leads to the droplet formation, with the droplets being able to migrate under some circumstances up to and into the fuel cell stack. Such droplets can have a negative effect on the degree of efficiency of a fuel cell system because they for example block fine flow passages in the area of the cathode. Moreover, it can transpire that a water droplet lands on a temperature sensor provided in the fuel cell system or in the fuel cell stack and cools it down to such an extent that the outlet signal of the temperature sensor simulates a temperature reduction of the fuel cell stack and leads, via the control of the fuel cell system, to an unnecessary and undesired switching off of the fuel cell system.

SUMMARY OF THE INVENTION

In order to satisfy this object there is provided in accordance with the invention, a water atomization apparatus for a fuel cell system, the apparatus comprising a supply tank for deionized water, a pressure pump connected to said supply tank, a reservoir which is fed by said pressure pump and contains deionized water under pressure in operation, a pressure regulating valve having an inlet connected to said reservoir and determining an operating pressure which prevails in said reservoir and at least one controllable injection valve connected to said reservoir for the delivery of atomized water.

An apparatus of this kind ensures, in operation, that deionized water which stands under pressure is always contained in the reservoir. Thus, an at least substantially constant pressure always exists at the inlet side of the injection valve on injecting water through the controllable injection valve and this forms a first precondition for a fine atomization of the water. This fine atomization of the water is also further improved by the use of a controllable injection valve in contrast to a simple nozzle.

A water atomization apparatus of this kind can not only be used for the fuel cell stack but also in other units which have a role to play in a fuel cell system, such as for example in a reformation unit which is used for the conversion of a hydrocarbon into a hydrogen rich synthesized gas or in another fuel processing system.

When the water atomization apparatus in accordance with the invention is used with a fuel cell stack, the controllable injection valve connected to the reservoir can inject the atomized water into the cathode side or into the anode side of the fuel cell stack. When using two or more injection valves the possibility also exists of injecting atomized water both into the cathode side and also into the anode side of the fuel cell stack. It is particularly favorable that the required humidification of the gases can take place both at the cathode side and also at the anode side with one water atomization apparatus.

It is particularly advantageous for the reservoir to be formed as an injection gallery, which can, for example, be arranged in tube form alongside the fuel cell stack. This tube form represents a favorably priced but nevertheless compact arrangement. As many connections as desired can be provided along the injection gallery so that a corresponding member of injection valves can be connected to the injection gallery.

Particularly preferred is a water atomization apparatus in which first and second injection valves are provided, the first injection valve being active at a lower power yield of the fuel cell system and the second injection valve being active, additionally or alternatively to the first injection valve, at a higher power yield.

In this manner a situation can be achieved in which only one kind of injection valve is provided which is ideally designed for the adjustable range of delivery and the increased requirement for water at a higher power yield of the fuel cell stack is satisfied in that the second injection valve is taken into operation in addition to the first injection valve. Naturally three or more injection valves can also be provided when it is necessary to atomize larger quantities of water per unit of time or to cover fuel cell systems of different sizes with one water atomization apparatus. In this way a type of basic module for the water atomization apparatus arises which can be used with fuel cell systems of different sizes, i.e. with different power yields. The adaptation of the basic module to the different fuel cell systems then only resides in controlling the pressure pump in accordance with the respective fuel cell system, i.e. appropriately selecting its power and providing a different number of injection valves. For this purpose one and the same basic module and one model of an injection valve or only a few different models of injection valves can be used for a large number of purposes, which leads to cost savings in manufacturing and in storage.

In a particularly preferred embodiment a control is provided to which the or each injection valve is connected, with the control being designed in order to control the opening and/or closing and/or the degree of opening of the or each injection valve. It is most favorable when the control is designed to control the or each injection valve by means of a PWM signal (pulse width modulated signal) in order to hereby preset a metered injection quantity of water from the respective injection valve. In other words the injection valve is opened by the control. A certain quantity of water is atomized and the valve is subsequently closed again, with the duration of opening of the valve being determined by the PWM signal. The frequency, with which the valve is repeatedly opened, is determined by the control, so that the quantity of water dispensed is determined by this frequency and by the respective duration of opening.

The injection, valve itself can in principle be formed in accordance with a petrol injection valve of a motor vehicle. In this connection it is only important that all the parts which come into the contact with the deionized water are formed as parts resistant to deionized water.

Although it would in principle be possible to design a control so that the controlling of the injection valves is effected in accordance with the respective operating state of the fuel cell system, it is more favorable to provide a humidity sensor which is associated with the cathode side of the fuel cell stack and connected to the control. In this case the humidity sensor delivers a precise information to the control on the degree of humidity that is present and enables a simplified characteristic field map control for the controlling of the injection valves in order to achieve the desired humidity level.

The humidity sensor is preferably associated with the cathode side outlet and/or arranged after the latter.

When the water atomization apparatus of the invention is used for the humidification of the anode side of the fuel cell stack then a humidity sensor is associated with the anode side of a fuel cell stack and connected to the control. In this case the humidity sensor is also preferably associated with the anode side outlet and/or arranged after it.

Further particularly preferred designs of the water atomization apparatus and of the components used therein can be found in the subordinate claims.

The method in accordance with the invention for the humidification of a gas flow supplied to a fuel cell system comprises the steps of: taking deionized water from a water supply tank and forwarding it by means of a pressure pump into a reservoir for storing said deionized water under pressure, determining one of a preset pressure level and a predetermined pressure range in said reservoir by means of a valve and injecting atomized water into said gas flow via at least one controllable injection valve connected to said reservoir.

Particularly preferred variants of the method of the invention can also be found in the subordinate claims.

The invention brings the advantages that one can better atomize deionized water. There is no droplet formation so that water droplets cannot be blown by the high air pressure of the compressor into the stack or land on the temperature sensor. The control time for the valves can be accurately preset and can be much better controlled than the time in which a nozzle is acted on by a pressure pump which is switched on and off. Thus, by means of the invention, the quantity of water injected can be substantially better controlled than is the case in the prior art.

The system is also better projected by the invention against undesired shutting down of the system, which was previously caused by droplet formation on the introduction of deionized water.

The invention will now be explained in the following in more detail with reference to embodiments and to the accompanying drawing.

BRIEF DESCRIPTION OF THE DRAWINGS

The single FIGURE of the drawing shows, in a highly schematic form and not true to scale, a PEM fuel cell system 10 which consists of a plurality of fuel cells 14 connected together to form a fuel cells tack 12.

DESCRIPTION OF THE PREFERRED EMBODIMENT

The fuel cells 14 each have, in manner known per se—as indicated by the enlarged representation in the circle—an anode 16, a cathode 18 and a membrane 20. For each fuel cell 14 the arrangement of the anode 16, the cathode 18 and the membrane 20, which forms the so-called MEA (Membrane Electrode Assembly) is arranged between two so-called bipolar plates 22 and each bipolar plate is arranged between two adjacent membrane electrode assemblies, that is apart from the end plates of the stack. At one side each such bipolar plate 22 forms, together with the anode 16 of the one fuel cell, a flow field for a fuel. At the other side each said bipolar plate forms, together with the cathode 18 of the adjacent fuel cell, a flow field for the gaseous oxidizing agent. The flow fields are frequently formed by fine channels which are worked or machined into the bipolar plate. The bipolar plates are each frequently assembled from two plates which lie surface to surface against one another, with cooling passages for a gaseous or liquid coolant being provided between the two plates. The design of fuel cells is well known per se and will not be described further here, because this specific design of the fuel cell is not of importance for the present invention.

It suffices to say that the fuel cells are so arranged in the fuel cell stack that the anodes are connected together and thus form an anode side 26 of the fuel cell stack. The cathodes of the individual fuel cells are likewise connected together and form a cathode side of the fuel cell stack.

The anode side 26 of the fuel cell stack has an inlet 30 for a fuel and an outlet 32 for non-consumed fuel as well as exhaust gases which arise at the anode side. In similar manner the cathode side 28 of the fuel cell stack 12 has an inlet 34 for a gaseous oxidizing agent such as air and an outlet 36 for exhaust gases arising at the cathode side. A compressor 38 is connected in front of the cathode side inlet 34 and is driven by an electric motor 40. The compressor sucks in air via a line 42 and an air filter 44 and feeds it into the cathode side inlet 34 of the cathode side 28 of the fuel cell stack 12. The air arriving at the inlet 34 is distributed through the internal flow passages of the fuel cell stack 12 into the anode side flow fields of the individual fuel cells 14, with a part of the oxygen contained in the sucked in air reacting catalytically with protons coming from the anode side 26 at the cathode side and thereby producing water and generating electrical power which can be tapped off at the terminals 46 and can for example be used for the electrical propulsion of a motor vehicle which has the fuel cell system as a source of propulsion.

The cathode side exhaust gases, which principally consist of nitrogen, which is a component of the induced air and is not consumed in the fuel cell stack 12, of water vapor and fine droplets of water which arise by the reaction of oxygen with protons coming from the anode side and also of non-consumed oxygen, pass via a humidity sensor 48 and also a water separator device 50 to a valve 52 which, on the one hand, determines the operating pressure prevailing at the cathode side 28 and, on the other hand, discharges the cathode side exhaust gases, less the water component which is separated out at the separating device 50, into the environment via the line 54. In this connection it is rioted that the so discharged nitrogen, the water and the residual oxygen do not cause any pollution of the environment because they represent natural components of the environment.

The adjustment of the valve 52 is effected by a control 54 which is connected via a line 56 to the valve 52. For the line 56 only the respective connections to the control 54 and to the valve 52 are indicated in order to not unnecessarily complicate the drawing by this line and by the many lines which must otherwise be drawn in.

The humidity sensor 48 is also connected via a line 58 to the control 54. At the outlet of the water separating device 50 there are located two valves 60 and 62 respectively, with the valve 60 being connected via the line 64 to the control 54. The valve 60 can be opened by the control 54 in order to feed water via the line 66 into the supply tank 68. The supply tank 68 has filling level indicator 70 which is connected via a line 72 to the control 54. Thus the level indicator 70 indicates to the control at what points in time the valve 60 has to be opened in order to refill the tank 68 and closed again when the supply tank 68 is filled up.

The valve 62 is normally closed and is in any event closed during the filling of the supply tank 68. It can, however, be opened in order to drain excess water from the water separating device 50. The valve 62 is likewise connected to the control 54 and indeed via a line 74.

The drive motor 40 for the compressor 38 is also connected to the control 54 and indeed via a line 76.

At the anode side 26 of the fuel cell stack 12 there is located a supply tank 80 which in this example contains hydrogen, with the hydrogen from the supply tank 80 being able to be supplied via the valve 82 to the anode side inlet 30 of the fuel cell stack 12. The valve 82 which regulates the quantity of newly supplied fuel is connected to the control 54 via the line 84.

The hydrogen supplied flows through the flow fields provided at the anode side, with a part of the hydrogen being converted at the catalyst provided at the anode side into protons which migrate through the membranes 20 of the fuel cells 12 and react at the cathode side in the already described way and manner with the supplied atmospheric oxygen. The non-consumed fuel, here in the form of hydrogen, then leaves the anode side 26 of the fuel cell stack 12 via the outlet 32 together with water vapor and nitrogen which has diffused through the membranes of the fuel cells from the cathode side 28 to the anode side 26. The gases emerging from the outlet 32 flow through the line 85 via a further humidity sensor 86 and are then supplied again by a pump 90 to the anode side inlet 30. The humidity sensor 86 is connected via a line 92 to the control 54. In this manner the control 54 receives information concerning the prevailing relative humidity at the anode side 26 of the fuel cell stack 12.

Since the increasing accumulation of nitrogen at the anode side 26 of the fuel cell stack in operation leads to the current generation being impaired, a part of the gases flowing at the anode side is continuously or discontinuously discharged via the valve 88, with the valve 88 being controlled for this purpose via the line 94 by the control 54. In manner known per se the exhaust gases discharged via the valve 88 are supplied to a catalytic burner device which removes the remainder of the hydrogen content by combustion, so that the cleaned exhaust gases can be discharged without reservation into the environment, because they only consist of natural components of the environmental air.

The reference numeral 100 points to a cooling circuit having a pump 102 which pumps a coolant liquid through a radiator 104 and into the cooling passages provided in the bipolar plates in order to keep the fuel cell stack 12 in a desired temperature range.

The fully demineralized, i.e. deionized water present in the water supply tank 68 is sucked in by a pump 110 via a line 112 and is pumped via a further pressure line 114 into a reservoir in the form of an elongate injection gallery 116. A pressure above atmospheric pressure builds up in the injection gallery 116 which can lie between 0.2 bar and 10 bar and normally lies between 1 and 3 bar. The maximum pressure is restricted by a pressure regulator 118 in the sense that when the pressure present in the reservoir 116 thus reaches the maximum set pressure the pressure regulator 118 discharges or feeds a part of the water stored in the gallery 116 back into the water supply tank 68 via the return line 120.

The pressure regulating valve 118 can be a purely mechanically acting pressure regulating valve, can however also be an electronically controlled pressure regulating valve which is connected via a control line 122 to the control 54. Thus the maximum pressure level in the injection gallery 116 can be determined by the control 54 via the control line 122.

The reference numeral 124 points to a pressure sensor which can be connected to the injection gallery 116 to determine the pressure prevailing there. The pressure sensor 124 is connected via a line 126 to the control 54 and delivers an actual value for the pressure prevailing in the injection gallery 116 to the control 54, which can take this into account when controlling the pressure regulating valve 118 via the line 122. The pressure sensor 124 is not essential when using a purely mechanically acting pressure regulating valve, can however nevertheless be useful in order to give the control 54 information concerning the operating state of the water atomization device.

The reference numeral 128 points to a bleed valve which can be actuated manually in order to bleed air from the injection gallery 116 at the pressure side on taking the system to operation. The bleed valve 128 can however also be a mechanical self bleeding valve. The valve 128 could however also be an electronically controlled valve which is controlled from time to time in order to bleed the injection gallery 116 at intervals, when it turns out that air repeatedly collects in the injection gallery 116.

The reference numeral 130 points to an optionally provided accumulator with a gas cushion 132 which stands under pressure and which is separated from the liquid contained in the gallery 116 by a membrane 136. This accumulator 130 can be used in order to suppress pressure peaks or fluctuations in the over pressure in the injection gallery 116, if it turns out that pressure peaks or fluctuations in pressure are problematic.

In this example three injection valves 140, 142 and 144 are connected to the injection gallery 116 and indeed via respective pressure lines 146, 148 and 150. The first injection valve 140, which can be designed in accordance with a petrol injection valve known per se for a normal motorcar, serves, on being energized by the line 152, to inject water in finely atomized form into the inlet 39 of the compressor 38. The control line 152 is connected to the control 54 and injection valve 140 receives so-called PWM signals (pulse width modulatable voltage signals) from the control 54 which cause the injection valve 140 to open, to atomize water and to close again, with the total quantity of water injected depending on the frequency of the opening and closing processes and also on the duration of each injection process. The second injection valve 142 likewise serves to inject water into the compressor inlet, is however located for space reasons at a different position at the compressor 38.

The injection valve 142 is provided with its own control line 154 which is connected to the control 54.

The advantage of using two injection valves 141, 142 at the cathode side of the fuel cell stack 12 lies in the fact that for a low power yield only one injection valve, for example 140, must be controlled in order to take care of the required humidification of the inflowing air. If, in contrast, a larger quantity of water is required for the humidification of the inflowing air for a higher power yield, then further atomized water can additionally be injected via the valve 142 into the inflowing air.

The third injection valve 144 is provided at the anode side 26 and is controlled via the control line 156 from the control 54. The third injection valve 144 serves to adequately humidify the fuel supplied to the anode side 26 of the fuel cell stack when the humidity determined by the humidity sensor 68 is not sufficient. Since the control 54 obtains information both at the cathode side 28 and also at the anode side concerning the humidity prevailing there from the respective humidity sensor 48, 86, the control 54 can straightforwardly determine the metered quantity of atomized water which is to be injected into both sides of the fuel cell stack and can control the injection valves 140, 142 and 144 accordingly.

In the water supply tank fully demineralized (deionized water) is present because such water can be taken from the cathode side exhaust gases. Fully demineralized water is to be preferred, because one can ensure in this manner that no salt residues deposit in the system and impair the action of the system. The use of deionized water involves the danger of leaching out chemical components from various components. Accordingly all components of this system which come into contact with the deionized water must be resistant against deionized water. Favorable in this connection is the manufacture of the individual components, which come into contact with deionized water, of stainless steel or of other materials which are coated with Teflon.

In operation the pressure in the injection gallery 116 is increased by the electric motor 110. The pressure level in the injection gallery 116 is variably adjustable via the pressure regulator 118 which is inserted into the return flow line 120 of the injection gallery 116. The pressure regulator 118 ensures that a predetermined pressure is present in the system, i.e. in the injection gallery 116. If the pressure in the system sinks, for example because water is taken from the injection gallery 116, the electric pump 110 is activated in order to reestablish the pressure. The pressure regulating valve 118 can be a purely mechanical valve, but also an electrically adjustable pressure regulating valve. In an electrically controlled pressure valve one can, with the aid of the control apparatus 54, set the pressure via the voltage outlet 122. This system additionally requires the pressure sensor 124 as a feedback concerning the actual pressure in the system.

With a mechanical pressure regulating valve the pressure is preset to the desired value. It is possible to bleed the system through a manually operable bleeding valve 128. One can also use a mechanical self bleeding valve for this purpose in order to carry out the bleeding.

The pressure of the injection nozzle (injection valve), present as a result of the pressure in the injection gallery, ensures that on controlling the valve or the valves the atomization (spray) is significantly finer than is the case with the present system.

With a high air pressure at the cathode side the air is preheated and thus becomes drier. Depending on the temperature, deionized water is injected into the compressor under the control of a characteristic field map, which has to be established. At very high temperatures it can be necessary to use a second injection valve. The injection system corresponding to the invention can be enlarged as desired to a plurality of injection nozzles and can thus be easily adapted to different sizes of the fuel cell stack, i.e., with large fuel cell stacks 12, a plurality of injection nozzles of the same design can be used both at the cathode side and also at the anode side in order to cover the requirement for atomized water. It is possible to meter the quantity injected very accurately through the control by means of a PWM signal (pulse width modulatable voltage signal).

Although the present water atomization apparatus has been described in conjunction with PEM fuel cells it can be used with all types of fuel cells where the humidification of operating gases is necessary.

The invention claimed is:

1. Water atomization apparatus for a fuel cell system, the apparatus comprising:
   a supply tank for deionized water; a pressure pump connected to said supply tank;
   a reservoir which is fed by said pressure pump and contains deionized water under pressure in operation, said reservoir being formed as an injection gallery;
   a pressure regulating valve having an inlet connected to said reservoir and determining an operating pressure which prevails in said reservoir; and
   at least one controllable injection valve connected to said reservoir for the delivery of atomized water.

2. Water atomization apparatus for a fuel cell system, the fuel cell system comprising a plurality of fuel cells connected together to form a fuel cell stack and each having an anode, a cathode and a membrane, said fuel cell system having:
   an anode side with an inlet for a fuel and an outlet for non-consumed fuel and exhaust gases which arise at said anode side;
   a cathode side with an inlet for a gaseous oxidation agent and an outlet for exhaust gases arising at the cathode side; and
   a compressor connected upstream of the cathode side inlet, said water atomizing apparatus further comprising:

a supply tank for deionized water; a pressure pump connected to said supply tank;

a reservoir fed by said pressure pump and containing deionized water under pressure in operation, said reservoir being formed as an injection gallery;

a pressure regulating valve having an inlet connected to said reservoir and determining an operating pressure which prevails therein; and at least one controllable injection valve adapted to inject atomized water into at least one of said cathode side and said anode side of said fuel cell stack.

3. Water atomization apparatus in accordance with claim 2 and further comprising first and second injection valves, said first injection valve being active at a lower power yield of said fuel cell system and said second injection valve being effective additionally to said first injection valve at a higher power yield.

4. Water atomization apparatus in accordance with claim 2 and further comprising first and second injection valves, said first injection valve being active at a lower power yield of said fuel cell system and said second injection valve being effective alternatively to said first injection valve at a higher power yield.

5. Water atomization apparatus in accordance with claim 1, there being a control to which the or each said injection valve is connected, said control being designed to control at least one of the opening, the closing and the degree of opening of said at least one injection valve.

6. Water atomization apparatus in accordance with claim 2, there being a control to which the or each said injection valve is connected, said control being designed to control at least one of the opening, the closing and the degree of opening of said at least one injection valve.

7. Water atomization apparatus in accordance with claim 5, said control being designed to control the or each said injection valve by means of a PWM signal in order to hereby preset a metered injection quantity of water from the said at least one injection valve.

8. Water atomization apparatus in accordance with claim 6, said control being designed to control the or each said injection valve by means of a PWM signal in order to hereby preset a metered injection quantity of water from said at least one injection valve.

9. Water atomization apparatus in accordance with claim 5, said control including an establishment of a characteristic field map control for each said injection valve.

10. Water atomization apparatus in accordance with claim 6, said control including an establishment of a characteristic field map control for each said injection valve.

11. Water atomization apparatus in accordance with claim 2, said at least one injection valve being designed in a manner of a fuel injection valve of a petrol operated piston engine.

12. Water atomization apparatus in accordance with claim 2, there being an accumulator connected to said reservoir, said accumulator having a housing containing a gas cushion and a membrane separating said gas cushion from said deionized water in said reservoir.

13. Water atomization apparatus in accordance with claim 1, wherein all components which come into contact with the deionized water are formed as parts resistant to deionized water.

14. Water atomization apparatus in accordance with claim 2, wherein all components which come into contact with the deionized water are formed as parts resistant to deionized water.

15. Water atomization apparatus in accordance with claim 6, there being a humidity sensor associated with said cathode side of said fuel cell stack, said humidity sensor being connected to said control.

16. Water atomization apparatus in accordance with claim 15, said humidity sensor being associated with said cathode side outlet.

17. Water atomization apparatus in accordance with claim 15, said humidity sensor being disposed after said cathode side outlet.

18. Water atomization apparatus in accordance with claim 6, there being a humidity sensor associated with said anode side of said fuel cell stack, said humidity sensor being connected to said control.

19. Water atomization apparatus in accordance with claim 18, said humidity sensor being associated with said anode side outlet.

20. Water atomization apparatus in accordance with claim 18, said humidity sensor being disposed after said anode side outlet.

21. Water atomization apparatus in accordance with claim 1, said pressure regulating valve being a purely mechanically operating pressure regulating valve.

22. Water atomization apparatus in accordance with claim 2, said pressure regulating valve being a purely mechanically operating pressure regulating valve.

23. Water atomization apparatus in accordance with claim 1, said pressure regulating valve being an electrically adjustable pressure regulating valve.

24. Water atomization apparatus in accordance with claim 2, said pressure regulating valve being an electrically adjustable pressure regulating valve.

25. Water atomization apparatus in accordance with claim 23, said pressure regulating valve being connected to said control.

26. Water atomization apparatus in accordance with claim 24, said pressure regulating valve being connected to said control.

27. Water atomization apparatus in accordance with claim 1, there being a pressure sensor for determining a pressure in said reservoir, said pressure sensor being connected to one of said pressure regulating valve and said control.

28. Water atomization apparatus in accordance with claim 2, there being a pressure sensor for determining a pressure in said reservoir, said pressure sensor being connected to one of said pressure regulating valve and said control.

29. Water atomization apparatus in accordance with claim 1, said pressure regulating valve having a drain.

30. Water atomization apparatus in accordance with claim 2, said pressure regulating valve having a drain.

31. Water atomization apparatus in accordance with claim 29, said drain of said pressure regulating valve being connected to said water supply tank.

32. Water atomization apparatus in accordance with claim 30, said drain of said pressure regulating valve being connected to said water supply tank.

33. Water atomization apparatus in accordance with claim 2, and further comprising a bleed valve.

34. Water atomization apparatus in accordance with claim 33, said bleed valve being manually operatable.

35. Water atomization apparatus in accordance with claim 33, said bleed valve being mechanical self bleeding valve.

36. Water atomization apparatus in accordance with claim 6, there being at least one temperature sensor, said temperature sensor being connected to said control.

37. Water atomization apparatus in accordance with claim 2, said at least one injection valve being adapted to inject water into said compressor.

38. Water atomization apparatus in accordance with claim 2, said at least one injection valve being adapted to inject water into air sucked in by said compressor.

39. Water atomization apparatus in accordance with claim 2, said reservoir being adapted to permit the attachment of a plurality of injection valves.

40. Water atomization apparatus in accordance with claim 2, there being a connection between said cathode outlet and said water supply tank to supply at least a part of any water emerging out of the fuel cell stack with cathode side exhaust gases to said water supply tank.

41. A method for the humidification of a gas flow supplied to a fuel cell system, the method comprising:
   taking deionized water from water supply tank and forwarding it by means of a pressure pump into a reservoir for storing said deionized water under pressure, said reservoir being formed as an injection gallery;
   determining one of a preset pressure level and a predetermined pressure range in said reservoir by means of a valve; and
   injecting atomized water into said gas flow via at least one controllable injection valve connected to said reservoir.

42. A method in accordance with claim 41, and comprising the further acting on each said injection valve by PWM signals from a control, and using at least one of a repetition frequency of said PWM signals and one of said selected pressure level and said predetermined pressure range to determine a quantity of atomized water fed into said gas flow.

43. A method in accordance with claim 41, wherein the control of each said injection valve is effected using characteristic field map control.

44. A method in accordance with claim 41 and comprising the further directing, to a control system for a fuel cell stack having an anode side and a cathode side, temperature signals which specify at least one of a temperature of air supplied to said fuel cell stack and an operating temperature of said fuel cell stack as well as humidity values determined at least one of said cathode side and said anode side of said fuel cell stack, using said control system to determine from these signals and values a respectively appropriate characteristic field map control for each said injection valve and controlling each said injection valve in accordance with said respectively appropriate characteristic field map control.

45. A method in accordance with claim 44 and comprising the further taking account of at least one operating parameter of said fuel cell stack determining said respectively appropriate characteristic field map control.

* * * * *